(12) United States Patent
Levin et al.

(10) Patent No.: US 8,635,858 B2
(45) Date of Patent: Jan. 28, 2014

(54) FLUID-SPRAY ATOMIZER

(75) Inventors: Michael Levin, Ann Arbor, MI (US); Furqan Zafar Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 13/280,701

(22) Filed: Oct. 25, 2011

(65) Prior Publication Data

US 2013/0098004 A1   Apr. 25, 2013

(51) Int. Cl.
*F01N 3/00* (2006.01)
(52) U.S. Cl.
USPC .................. 60/295; 60/299; 60/301; 138/42; 366/175.2; 366/340
(58) Field of Classification Search
USPC ......... 60/274–324; 366/175.2, 336, 337, 340; 138/38–46
See application file for complete search history.

(56) References Cited

U.S. PATENT DOCUMENTS

| 4,497,752 | A | * | 2/1985 | Huber | 261/95 |
| 4,899,812 | A | * | 2/1990 | Altoz | 165/109.1 |
| 5,082,478 | A | * | 1/1992 | Oono et al. | 55/466 |
| 5,697,403 | A | * | 12/1997 | Onishi et al. | 138/37 |
| 5,758,967 | A | * | 6/1998 | King | 366/337 |
| 6,074,619 | A | * | 6/2000 | Schoubye | 423/239.1 |
| 6,547,433 | B2 | * | 4/2003 | Yazici et al. | 366/336 |
| 6,905,658 | B2 | * | 6/2005 | Rogers et al. | 422/172 |
| 7,793,494 | B2 | | 9/2010 | Wirth et al. | |
| 7,814,745 | B2 | | 10/2010 | Levin et al. | |
| 8,082,732 | B2 | * | 12/2011 | Nefischer | 60/300 |
| 8,209,965 | B2 | * | 7/2012 | Mabuchi | 60/295 |
| 8,272,777 | B2 | * | 9/2012 | Kohrs et al. | 366/337 |
| 2007/0036694 | A1 | * | 2/2007 | Nishioka et al. | 422/168 |
| 2007/0113555 | A1 | * | 5/2007 | Carroni | 60/737 |
| 2007/0204751 | A1 | | 9/2007 | Wirth et al. | |
| 2010/0132344 | A1 | | 6/2010 | Peters | |

FOREIGN PATENT DOCUMENTS

DE   4313393 A1   10/1994
JP   8303136 A   11/1996

* cited by examiner

*Primary Examiner* — Thomas Denion
*Assistant Examiner* — Jesse Bogue
(74) *Attorney, Agent, or Firm* — Julia Voutyras; Alleman Hall McCoy Russell & Tuttle LLP

(57) ABSTRACT

An exhaust aftertreatment system is provided. In one embodiment, the system includes a catalyst, and injector positioned upstream from the catalyst, and a fluid-spray atomizer positioned between the catalyst and the injector. The fluid-spray atomizer includes a plurality of horizontal slats, wherein each horizontal slat is a different size and a smaller horizontal slat is nested at least partially inside a larger horizontal slat.

20 Claims, 4 Drawing Sheets

FLUID-SPRAY ATOMIZER

BACKGROUND AND SUMMARY

Vehicles may introduce a liquid spray into an airflow of an internal combustion engine for various reasons. For example, diesel engines may employ exhaust aftertreatment systems to reduce gaseous compounds such as nitrogen oxides ($NO_x$). One method involves injecting a reductant, such as an aqueous urea solution, into the exhaust system upstream from a selective catalytic reaction (SCR) catalyst. When injected into the gas flow, urea decomposes to ammonia ($NH_3$), which is captured and stored on a surface of the downstream SCR catalyst. The stored ammonia catalyzes the reduction of $NO_x$ to nitrogen ($N_2$) and water ($H_2O$) as the exhaust gas flows through the SCR catalyst. Various systems for ensuring proper mixing of the urea solution with the exhaust gas flow have been proposed.

For example, US2010/0132344 describes a static mixer that allows for mixing of a liquid spray injected within an exhaust gas flow. The static mixer includes a number of guide vane plates that create a number of grating openings arranged in several rows to form a ring shape that fits the geometry of the exhaust pipe. The guide vane plates are tilted, preferably between 40-60 degrees, relative to a plane of the static mixer and project away from the mixer plane.

The inventors herein have recognized various issues with the above system. In particular, the particular geometry of the static mixer relies upon a particular arrangement of the spray nozzle with the exhaust gas flow, such as injecting the liquid spray at a bend of the exhaust pipe. Thus, the liquid spray is injected in line with the exhaust gas flow and the static mixer is positioned downstream from the injector to induce turbulence via the tilted guide vane plates, which leads to mixing of the fluid-spray and the exhaust gas. In general, pipe bends require longer mixing lengths to achieve a spray direction that is coaxial with the exhaust gas flow. Thus, such an arrangement may not be included in smaller vehicle applications where exhaust system size is limited.

As such, one example approach to address the above issues is to provide a fluid-spray atomizer that receives a liquid spray from a non-gas flow direction and redirects the liquid spray to follow a gas flow direction. In this way, it is possible to inject a fluid into an exhaust gas flow, without positioning the fluid-spray atomizer at a pipe bend and/or downstream from the pipe bend. Specifically, the fluid-spray atomizer may include a plurality of horizontal slats, wherein each horizontal slat is in line with the exhaust gas flow direction. Further, each horizontal slat may be a different size in at least one dimension and/or each horizontal slat may have a skewed position with respect to another horizontal slat at an upstream side of the fluid-spray atomizer. This configuration enables droplets from the fluid-spray to be received from the non-gas flow direction. Thus, the fluid-spray atomizer may be suitable for any vehicle application due to the resulting geometric configuration of the fluid-spray atomizer. Therefore, the fluid-spray atomizer may be suitable for any vehicle application due to a compatibility of the fluid-spray atomizer with a variety of different positions/locations and resulting spray target angles. Further, the resulting geometric configuration may reduce fluid-spray droplet size and may disperse the droplets within a mixing region of the exhaust passage.

Note that the horizontal slats may be arranged in any suitable geometry for receiving the fluid-spray and entraining fluid-spray droplets to a downstream side of the fluid-spray atomizer. For example, the horizontal slats may be in a louver configuration, a stacked configuration, a nested configuration, a step-wise configuration, and/or a cascading tier configuration. Further, the particular geometry of the fluid-spray atomizer may be configured to receive any suitable spray footprint in terms of size and/or geometry of the footprint. Further still, the fluid-spray atomizer may be positioned downstream from a pipe bend, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to an exhaust aftertreatment system including a catalyst, an injector positioned upstream from the catalyst, and a fluid-spray atomizer positioned between the catalyst and the injector. According to one embodiment, the fluid-spray atomizer includes a plurality of horizontal slats, which are arranged in such a way that each of the plurality of horizontal slats are in line with an exhaust gas flow, and can receive a fluid-spray from a non-gas flow direction to redirect the fluid-spray to the gas flow direction. This arrangement allows the exhaust system to have any suitable arrangement. Further, this system allows for a more compact design with a lower weight than traditional designs due to the resulting geometric configuration.

Further, the horizontal slats may have any suitable arrangement for receiving the fluid-spray and entraining fluid-spray droplets to a downstream side of the fluid-spray atomizer. For example, the horizontal slats may be in a louver configuration, a stacked configuration, a nested configuration, a step-wise configuration, and/or a cascading tier configuration. Further, the particular geometry of the fluid-spray atomizer may be configured to receive any suitable fluid-spray footprint in terms of size and/or geometry of the footprint. Further still, the fluid-spray atomizer may be positioned downstream from a pipe bend, if desired.

Figure 1:
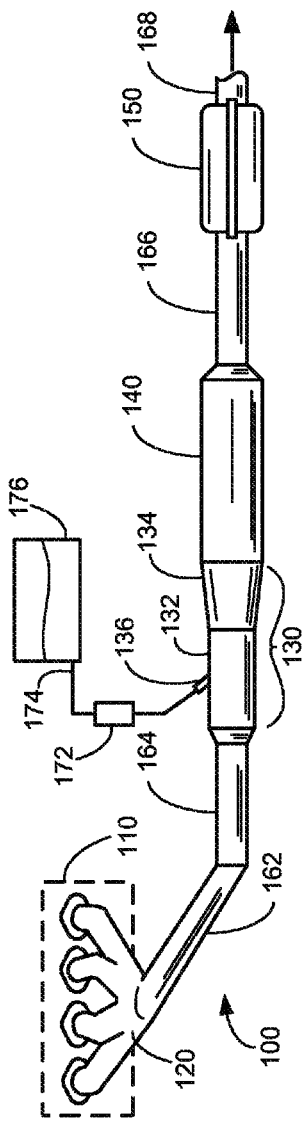
FIG. 1 shows a schematic diagram of an example exhaust system for an internal combustion engine according to an embodiment of the present disclosure.

FIG. 1 illustrates an exhaust system 100 for transporting exhaust gases produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others. In some embodiments, engine 110 may be configured in a propulsion system for a vehicle. However, in other embodiments, engine 110 may be operated in a stationary application such as an electric generator, for example. While exhaust system 100 may be applicable to stationary applications, it should be appreciated that exhaust system 100 as described herein, is particularly adapted for vehicle applications, particularly to reduce a length of a mixing region of exhaust gases and reductant.

Exhaust system 100 may include one or more of the following: an exhaust manifold 120 for receiving exhaust gases produced by one or more cylinders of engine 110, a mixing region 130 arranged downstream of exhaust manifold 120 for receiving a liquid reductant, a selective catalytic reductant (SCR) catalyst 140 arranged downstream of the mixing region 130, and a noise suppression device 150 arranged downstream of catalyst 140. Additionally, exhaust system 110 may include a plurality of exhaust pipes or passages for fluidically coupling the various exhaust system components. For example, as illustrated by FIG. 1, exhaust manifold 120 may be fluidically coupled to mixing region 130 by one or more of exhaust passages 162 and 164. Catalyst 140 may be fluidically coupled to noise suppression device 150 by exhaust passage 166. Finally, exhaust gases may be permitted to flow from noise suppression device 150 to the surrounding environment via exhaust passage 168. Note that while not illustrated in FIG. 1, exhaust system 100 may include a particulate filter and/or diesel oxidation catalyst arranged upstream or downstream of catalyst 140. Furthermore, it should be appreciated that exhaust system 100 may include two or more catalysts. Catalytic converter 140 can include multiple catalyst bricks, in one example. In another example, multiple emission control devices, each with multiple bricks, can be used. Catalytic converter 140 can be a three-way type catalyst in one example.

In some embodiments, mixing region 130 can include a greater cross-sectional area or flow area than upstream exhaust passage 164. Mixing region 130 may include a first portion 132 and a second portion 134. The first portion 132 of mixing region 130 may include an injector 136 for selectively injecting a liquid into the exhaust system. As one non-limiting example, the liquid injected by injector 136 may include a liquid reductant such as ammonia or urea. Further, the liquid reductant may be stored within storage tank 176 and provided to injector 136 via conduit 174 using pump 172, for example. The second portion 134 of mixing region 130 may be configured to accommodate a change in cross-sectional area or flow area between the first portion 132 and the catalyst 140. Note that catalyst 140 can include any suitable catalyst for reducing NOx or other products of combustion resulting from the combustion of fuel by engine 110.

Note that with regards to vehicle applications, exhaust system 100 may be arranged on the underside of the vehicle chassis. Additionally, it should be appreciated that the exhaust passage may include one or more bends or curves to accommodate a particular vehicle arrangement. Further still, it should be appreciated that in some embodiments, exhaust system 100 may include additional components not illustrated in FIG. 1 or may omit components described herein.

Further, exhaust system 100 may include various sensors for providing an indication of exhaust gas air/fuel ratio, for example. Therefore, it will be appreciated that exhaust system 100 may include one or more of a UEGO (universal or wide-range exhaust gas oxygen), a two-state oxygen sensor or EGO, a HEGO (heated EGO), a $NO_x$ sensor, a HC sensor, a CO sensor, and a particulate matter sensor. When included, the various sensors may be located at any suitable position within exhaust system 100. For example, one or more of the various sensors may be positioned upstream from catalyst 140. As another example, one or more of the various sensors may be positioned downstream from catalyst 140. Further, one or more of the various sensors may be positioned at catalyst 140, for example. The exhaust system may include light-off catalysts and underbody catalysts, as well as exhaust manifold, upstream and/or downstream air-fuel ratio sensors.

Figure 2:
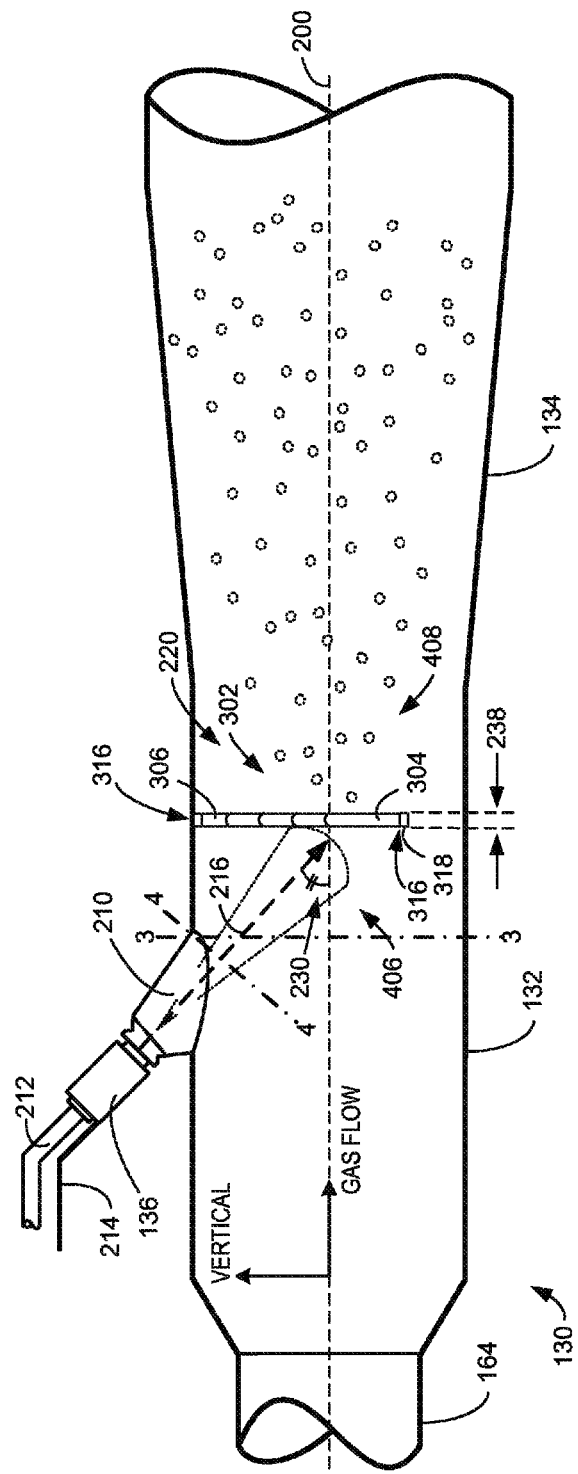
FIG. 2 shows a schematic diagram of an example exhaust aftertreatment system that may be included in the example exhaust system of FIG. 1.

FIG. 2 illustrates a side view of mixing region 130 in greater detail as a longitudinal cross-section. A center longitudinal axis of mixing region 130 is indicated at 200. Injector 136 is shown coupled to a wall of the first portion 132 of mixing region 130 by an injector boss 210. In this example, injector 136 is external to the flow area of the exhaust passage. In this way, the injector may be protected from thermal degradation, which may be caused by high temperature exhaust gases. Further, as the injector may be recessed beyond the wall of the exhaust passage via the injector boss, interruption of the exhaust flow by the injector may be reduced. Injector 136 can inject, through an opening in the wall of the mixing region, a liquid supplied to it by conduit 212 in response to a control signal received via communication line 214 from an electronic control system of engine 110. The liquid may be supplied to injector 136 through conduit 212 from a storage tank via an intermediate pump, as introduced above. Note that the pump may also be controlled by an electronic control system of engine 110 to provide suitably pressurized reductant to injector 136.

Injector 136 can be oriented to inject the reductant toward a fluid-spray atomizer 220 along an injection axis 216 as a spray. As one non-limiting example, fluid-spray atomizer 220 may include a louver-like structure to redirect the injected reductant and facilitate break-up of the spray into smaller droplets. Therefore, fluid-spray atomizer 220 may include a plurality of horizontal slats that align horizontally with respect to axis 220, for example. In this way, the horizontal slats of fluid-spray atomizer 220 may be parallel to the exhaust gas flow through mixing region 130. A non-limiting example of fluid-spray atomizer 220 having a louver configuration is described in greater detail with reference to FIGS. 2-3. In some embodiments, injection axis 216 can be coincident with a center of the spray pattern provided by injector 136. The spray pattern provided by injector 136 may include any suitable pattern for improving the mixing and evaporation rate of the reductant with the exhaust gases. For example, an injector can provide sprays that form sheets, filled cones, hollow cones, multiple cones, etc.

Injection axis 216 can be directed at a particular region of fluid-spray atomizer 220. As one non-limiting example, injection axis 216 can intersect the center of fluid-spray atomizer 220, which may also be coincident with longitudinal axis 200. In this example, injector boss 210 is configured to couple injector 136 to the wall of the exhaust system so that injection axis 216 is angled relative to longitudinal axis 200 at an angle indicated by 230. As one non-limiting example, angle 230 may be an angle of approximately 45 degrees. As another example, angle 230 may be an angle between 20 degrees and 55 degrees. For example, angle 230 may be approximately 30 degrees. However, it should be appreciated that other suitable angles may be utilized.

Note that the angles described herein may be with reference to a particular flow condition. For example, the angle of injection axis 216 as described above may be measured with reference to a condition where there is no exhaust flow. As the flow of exhaust gases increase, the spray pattern provided by the injector may change as the liquid reductant is entrained by the exhaust gases.

In some examples, geometric constraints associated with an exhaust system may serve to increase the rate at which evaporation and mixing of the reductant with the exhaust gases is to be performed so that the reductant is sufficiently atomized prior to reaching the catalyst. Further, some exhaust system configurations may require that the drops of liquid within the spray be less than a particular size to achieve a particular rate of evaporation and/or mixing of the liquid into the exhaust gases. As one non-limiting example, for some exhaust systems, the drops of liquid within the spray may be 50 microns in diameter, or less. For example, the drops of liquid may be as small as 20 microns in diameter to effectively accommodate the downstream SCR catalyst. However, the price of an injector may increase in proportion to a decreasing size of the drops of liquid provided by its spray. Thus, in order to reduce cost of the injector, it may be desirable to improve mixing and evaporation rates so that an injector providing a spray having larger drops of liquid may be used. Furthers still, deposition of reductant onto the wall surfaces and catalyst of the exhaust system should be reduced to avoid formation of deposits upon evaporation of the liquid from these surfaces.

Fluid-spray atomizer 220 can be configured with a plurality of louvers or horizontal slats for redirecting the liquid spray along a trajectory that is substantially more parallel to the exhaust flow than injection axis 216. In this way, the spray may be prepared for downstream exhaust aftertreatment. As one example, fluid spray atomizer 220 can be optimized to improve spray dispersion over the cross-section of the mixing region before entering a downstream device, such as SCR catalyst 140. Additionally, fluid-spray atomizer 220 may increase breakup/dispersion of the droplets of the liquid spray as it impacts the louvers or horizontal slats. Fluid-spray atomizer 220 as illustrated in FIG. 2 may include a longitudinal width or thickness indicated at 238 and may at least partially occupy the cross-sectional area or flow area of the first portion 132 of mixing region 130.

It will be appreciated that the embodiment as illustrated in FIG. 2 is provided by way of example, and thus, is not meant to be limiting. Therefore, the aftertreatment system may include additional and/or alternative components than those included within mixing region 130, as shown. As one example, mixing region 130 may include an upstream mixing device configured to induce turbulence or increase turbulence in the flow of exhaust gases to improve mixing of the downstream injected liquid.

Further, in some embodiments, a mixing device may be arranged downstream of fluid spray atomizer 220, if desired. For example, the downstream mixing device may be included within an expanding region of the exhaust passage, such as second portion 134 of mixing region 130. As one non-limiting example, the downstream mixing device may include a helical configuration to force the exhaust gases and the entrained droplets of the injected liquid to follow a longer path along or around the mixing device, which can increase the evaporation time of the liquid.

In this way, mixing of the exhaust gases and the injected liquid can be improved, thereby reducing a length of the mixing region, wherein the mixing region is defined herein as a distance between the injector and the face of the SCR catalyst. The resulting increase in the rate of mixing and evaporation of the liquid may be used to enable an increase in the size of the droplets of the liquid spray provided by the injector, thereby enabling a reduction in the cost of the injector, at least with some conditions.

Figure 3:
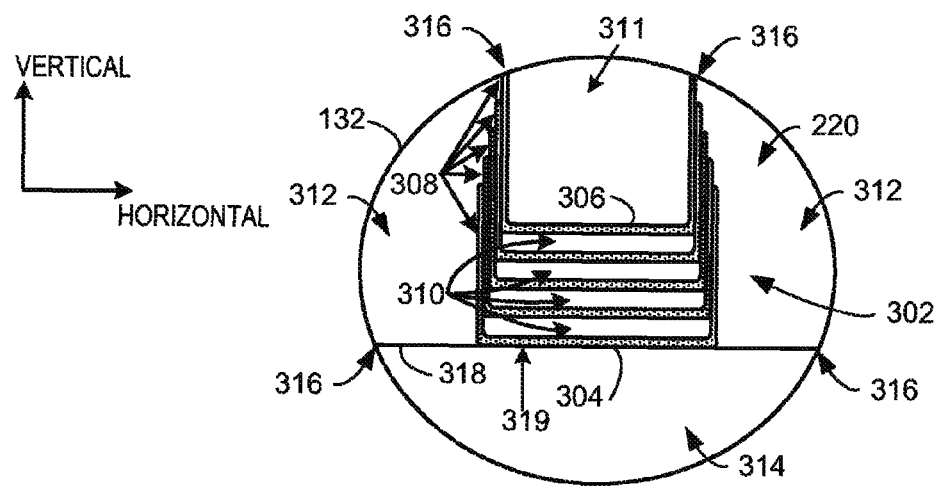
FIG. 3 shows a perspective view of a fluid-spray atomizer that may be included in the example aftertreatment system of FIG. 2 according to an embodiment of the present disclosure.
Figure 4:
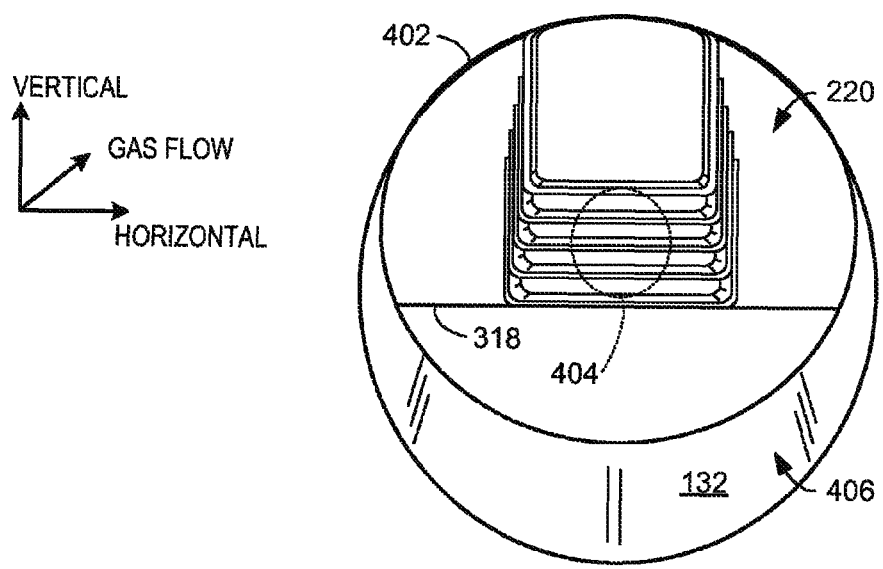
FIG. 4 shows another perspective view of the fluid-spray atomizer of FIG. 3.

FIG. 3 shows a sectional view of fluid-spray atomizer 220 taken along line 3-3 of FIG. 2 and FIG. 4 shows a perspective view of fluid-spray atomizer 220 taken along line 4-4 of FIG. 2.

Figure 5:
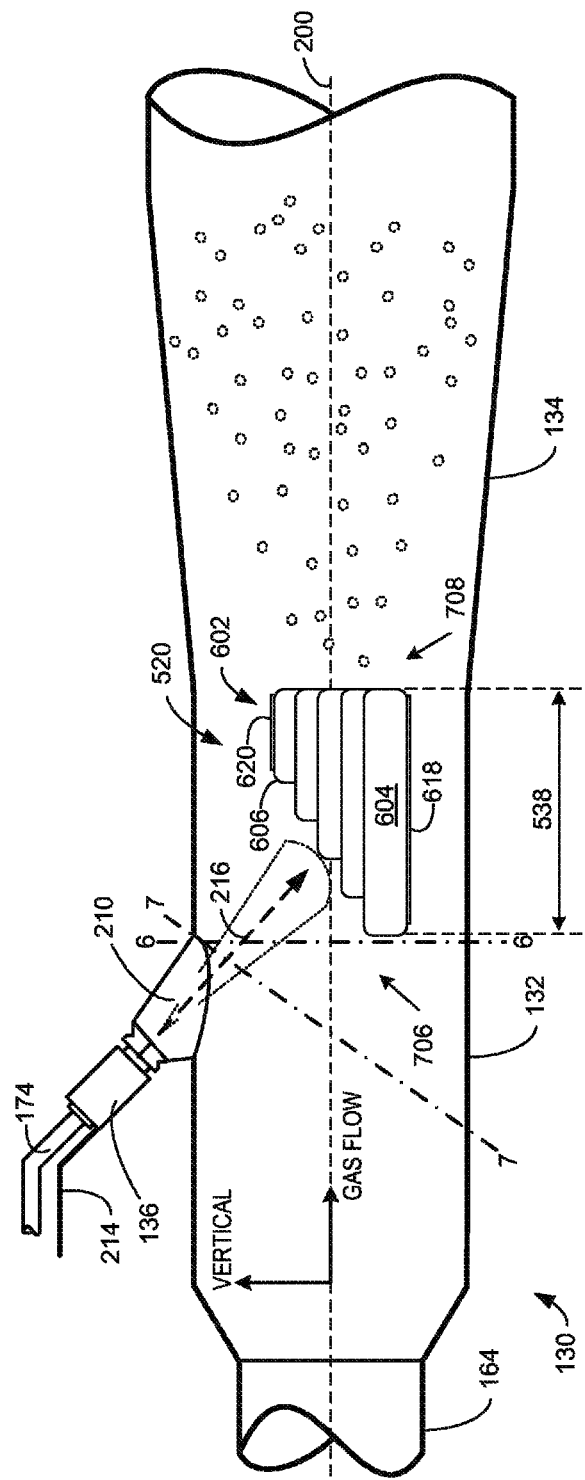
FIG. 5 shows a schematic diagram of another example exhaust aftertreatment system that may be included in the example exhaust system of FIG. 1.

Referring first to FIG. 3, it shows a cross-sectional view of mixing region 130 looking down axis 200 of FIG. 5. As such, fluid-spray atomizer 220 is positioned within an interior space of mixing region 130, and thus, may be circumferentially surrounded by walls 132.

As shown, fluid-spray atomizer 220 may include a plurality of horizontal slats 302 that may be arranged in a louver structure. Further, the plurality of horizontal slats 302 may be stacked on top of each other in a nested configuration.

As shown, each of the plurality of horizontal slats 302 may be nested inside each other, such that a smaller horizontal slat is nested at least partially inside another, larger horizontal slat. Thus, each of the plurality of horizontal slats 302 may be different in size in at least one dimension. For example, each of the plurality of horizontal slats 302 may differ in a horizontal length measured along the horizontal axis.

The embodiment illustrated in FIG. 3 shows the fluid-spray atomizer with five horizontal slats 302 stacked on top of each other and nested at least partially inside each other; however, it will be appreciated that fluid-spray atomizer 220 may include any suitable number of horizontal slats. For example, fluid-spray atomizer 220 may include more than five horizontal slats. As another example, fluid-spray atomizer 220 may include fewer than five horizontal slats.

As used herein, the horizontal direction may refer to a direction that is orthogonal to both a gas flow direction (e.g., along axis 200) and a vertical direction. As such, the horizontal direction and the vertical direction may define a cross-sectional plane through mixing region 130 such as the cross-section taken along line 3-3, wherein such a cross-sectional plane is orthogonal to an exhaust gas flow direction.

The plurality of horizontal slats 302 may be stacked such that the horizontal length of each horizontal slat decreases as the slats are stacked in the vertical direction, wherein the smallest horizontal slat is a closest horizontal slat to injector 136. For example, the stacked horizontal slats may form a pyramid-like structure, wherein the 'top' of the pyramid is closer to injector 136 than the largest horizontal slat, which may be positioned at the 'bottom' of the pyramid. As shown, horizontal slat 304 may be have the longest horizontal length and may be furthest from fuel injector 136 in a vertical direction. Further, each successive horizontal slat may decrease in horizontal length within the stack, with horizontal slat 306 on the 'top' with the shortest horizontal length.

As shown, each horizontal slat may include one or more vertical portions 308 that extend in a substantially orthogonal direction from the horizontal slat. For example, each horizontal slat may include two vertical portions 308 that extend vertically on opposing ends of the horizontal slat. For example, the vertical portions 308 may extend in a vertical direction to wrap around a portion of another horizontal slat. As another example, vertical portions 308 may provide a surface for coupling one horizontal slat to another horizontal slat. For example, the vertical portions of one horizontal slat may be welded to the vertical portions of another horizontal slat. Therefore, the vertical portions may be an interface for welding each of the horizontal slats together to form a collective louver structure. As such, horizontal slat 304 may be a base slat with each successive slat positioned between the vertical portions of the previous horizontal slat, wherein each of the plurality of horizontal slats are welded to each other at the site of the vertical portions.

Fluid-spray atomizer 220 may further include a plurality of channels 310. As shown, each channel 310 may be formed by a volumetric space between two adjacent horizontal slats. Therefore, the embodiment as illustrated in FIG. 3 includes four channels 310. However, it will be appreciated that fluid-spray atomizer 220 may include any suitable number of channels without departing from the scope of this disclosure. Thus, fluid-spray atomizer 220 is not limited to the four channels depicted in FIG. 3.

Channels 310 may enable exhaust gas flow to pass through fluid-spray atomizer 220 in the gas flow direction. Further, channels 310 may entrain droplets from an injected fluid-spray. Therefore, channels 310 may enable exhaust gas flow and droplet flow through a length of the fluid-spray atomizer in the gas flow direction. In this way, channels 310, and likewise horizontal slats 302, have a streamline position within the exhaust gas flow.

Fluid-spray atomizer 220 may further include a top fluid flow region 312 and a bottom fluid flow region 314. Regions 312 and 314 may be configured to enable exhaust gas flow and/or droplet flow similar to channels 310. As described in further detail below, since a footprint of a fluid-spray may be aimed at the fluid-spray atomizer, regions 312 and 314 may be a passage for exhaust gas flow and may include a minimal amount of fluid-spray droplets. Said in another way, channels 310 may be a passage for exhaust gas flow and droplet flow, whereas regions 312 and 314 may be a passage for exhaust gas flow. Therefore, it is within the realm of possibility that regions 312 and 314 may not include fluid-spray droplets in some embodiments.

Fluid-spray atomizer 220 may further include one or more attachment mechanisms 316 for attaching fluid-spray atomizer 220 to walls 132. For example, the one or more attachment mechanisms may be one or more plates coupled to a horizontal slat for welding the fluid-spray atomizer to the inner walls of the mixing region. As shown, fluid-spray atomizer 220 may include a welding plate 318 coupled to horizontal slat 304 for welding the atomizer to the mixing region walls, for example. In some embodiments, welding plate 318 may be welded to a bottom surface 319 of horizontal slat 304 and welded to mixing region walls 132. However, it will be appreciated that first welding plate 318 may be welded, or otherwise attached, to mixing region walls 132 in other ways.

Additionally or alternatively, fluid-spray atomizer 220 may be welded to mixing region walls 132 by welding vertical portions 308 of horizontal slat 306 directly to walls 132, for example. As shown, such a scenario would include two welding locations corresponding with each vertical portion 308 of horizontal slat 306. In such a scenario, an additional channel 311 may be formed between horizontal slat 306 and walls 132 with the region defined by vertical portions 308 welded to walls 132. It will be appreciated that channel 311 may be similar to channels 310 as already described. However, it will also be appreciated that channel 311 may differ to some degree. In particular, channel 311 may be associated with a greater cross sectional area than channels 310, for example.

It will be appreciated that fluid spray atomizer 220 may be welded to walls 132 in any suitable way. Further, fluid spray atomizer 220 may be oriented within walls 132 in any suitable way. For example, fluid spay atomizer 220 may be rotated by 180 degrees from the embodiment shown in FIG. 3. In other words, fluid spray atomizer 220 may be flipped upside down and vertical portions 308 of horizontal slat 306 may be welded to the opposing surface of walls 132. In this way, fluid spray atomizer 220 may be flipped such that the plurality of horizontal slats 302 are still substantially parallel to the gas flow direction.

The resulting geometric configuration of the fluid-spray atomizer may increase fluid-spray dispersion such that the droplet size of the fluid-spray is reduced upon contact with the plurality of horizontal slats, for example. Further, due to the above described geometric configuration, the fluid-spray atomizer may improve droplet mixing with the exhaust gas flow such that the mixing region may be reduced in length along the gas flow direction. The fluid-spray atomizer may be positioned within the mixing region so as to receive a spray footprint from injector 136.

For example, FIG. 4 shows another view of fluid-spray atomizer 220 from a perspective view from injector 136. In particular, the perspective view may be a planar cut along line 4-4 of FIG. 2. Therefore, fluid-spray atomizer 220 may be viewed looking down injector boss 210 towards the exhaust gas flow through mixing region 130. As shown, a portion of a field of view of the perspective view shown in FIG. 4 may be outlined by injector boss inner walls 402, whereas another portion of the field of view may include mixing region walls 132, for example.

As shown, a spray footprint 404 may strike a central region of fluid-spray atomizer 220. In this way, an injected fluid may be aimed in the central region coinciding with spray footprint 404 to maximize fluid-spray droplet mixing with the exhaust gas flow. As described above, the injected fluid may strike the fluid-spray atomizer from a non-gas flow direction, such as along injection axis 216, for example.

As shown, fluid-spray atomizer 220 may be in a stacked louver configuration such that each channel 310 is exposed to the fluid-spray. FIG. 2 shows a side view of the stacked louver configuration of fluid-spray atomizer 220. Due to the stacked louver configuration, a position of one horizontal slat may be nested inside at least a portion of another horizontal slat, as described above.

Referring to both FIGS. 2 and 4, the plurality of horizontal slats 302 may be nested and stacked such that the horizontal slats are flush with each other on an upstream side 406 and a downstream side 408 of fluid-spray atomizer 220. Said in another way, each of the plurality of horizontal slats 302 may have a similar longitudinal length (as measured along axis 200, for example) and each horizontal slat may be at least partially nested inside another horizontal slat such that the vertical portions and the horizontal portions of each of the slats are flush with each other on the upstream side and the downstream side of the fluid spray atomizer 220.

For example, as shown best in FIG. 2, the plurality of horizontal slats 302 may be stacked on a downstream side 408 such that each horizontal slat is aligned in a vertical direction. Said in another way, a downstream side of each of the plurality of horizontal slats may be flush with one another. Therefore, each of the horizontal slats may have a longitudinal length that is equal to longitudinal length 238.

In this way, the fluid-spray may strike the central region of the fluid-spray atomizer resulting in spray footprint 404 striking at the upstream side 406. The fluid-spray may hit the fluid-spray atomizer such that the fluid-spray is broken up into substantially smaller droplets. For example, injector 136 may inject a fluid-spray including coarse urea droplets approximately 80 to 100 microns in diameter. Upon striking the fluid-spray atomizer, the coarse urea droplets may be reduced in size to droplets approximately 20 to 50 microns in diameter, for example. Thus, the coarse droplets may be reduced in size such that the droplets are finer due to the geometric structure of the fluid-spray atomizer. It will be appreciated that the above is provided as one non-limiting example of reducing a droplet size and that other droplet size reductions are possible without departing from the scope of this disclosure.

Further, it will be appreciated that the geometric structure of the fluid-spray atomizer may be configured to receive any suitable fluid-spray footprint in terms of size and geometry. For example, the fluid-spray atomizer may reduce reductant spray droplet size from a filled cone spray, a hollow cone spray, a multiple stream spray, etc.

The plurality of channels 310 may entrain the finer droplets such that the exhaust gas flow carries the finer droplets through channels 310. The finer droplets may travel through the longitudinal length of the fluid-spray atomizer in the gas flow direction. The particular geometry of the fluid-spray atomizer may enable the finer droplets to exit the fluid-spray atomizer at the downstream side 408 such that the finer droplets are well dispersed within the mixing region 130. Said in another way, the finer droplets may be released from the fluid-spray atomizer such that mixing is enhanced due to a sufficiently wide spray dispersion within mixing region 130. Thus, a uniform mixture of exhaust gas and finer reductant droplet size may be presented to the downstream SCR catalyst. Therefore, $NO_x$ may be sufficiently reduced from the exhaust gas.

In this way, the plurality of horizontal slats 302 may align with the gas flow direction and may be configured to receive a fluid-spray from a non-gas flow direction. For example, injection axis 216 as shown in FIG. 2 follows the non-gas flow direction. As used herein, the non-gas flow direction may be any direction that is not the gas flow direction. For example, a horizontal direction and a vertical direction as described herein may be examples of non-gas flow directions.

It will be appreciated that fluid spray atomizer 220 is provided by way of example, and thus is not meant to be limiting. As such, fluid spray atomizer 220 may have another suitable geometry without departing from the scope of this disclosure. For example, the plurality of horizontal slats may be arranged in a step-wise configuration.

For example, FIG. 5 illustrates a side view of mixing region 130 including a fluid spray atomizer 520. It will be appreciated that FIG. 5 is similar to FIG. 2 and thus similar components have like reference numbers. For the sake of brevity, such components will not be discussed repeatedly.

Briefly, injector 136 can be oriented to inject the reductant toward a fluid-spray atomizer 520 along an injection axis 216 as a spray. As one non-limiting example, fluid-spray atomizer 520 may include a louver-like structure in a step-wise configuration to redirect the injected reductant and facilitate break-up of the spray into smaller droplets. Therefore, fluid-spray atomizer 520 may include a plurality of horizontal slats that align horizontally with respect to axis 200, where each horizontal slat is staggered, or offset from another horizontal slat, for example. In this way, the horizontal slats of fluid-spray atomizer 520 may be parallel to the exhaust gas flow through mixing region 130. A non-limiting example of fluid-spray atomizer 520 having a louver-like structure in a step-wise configuration is described in greater detail with reference to FIGS. 6-7. In some embodiments, injection axis 216 can be coincident with a center of the spray pattern provided by injector 136. The spray pattern provided by injector 136 may include any suitable pattern for improving the mixing and evaporation rate of the reductant with the exhaust gases. For example, an injector can provide sprays that form sheets, filled cones, hollow cones, multiple cones, etc.

Injection axis 216 can be directed at a particular region of fluid-spray atomizer 520. As one non-limiting example, injection axis 216 can intersect the center of fluid-spray atomizer 520, which may also be coincident with longitudinal axis 200. In this example, injector boss 210 is configured to couple injector 136 to the wall of the exhaust system so that injection axis 216 is angled relative to longitudinal axis 200 at an angle indicated by 230, as described above.

Fluid spray atomizer 520 can be configured with a plurality of louvers or horizontal slats for redirecting the liquid spray along a trajectory that is substantially more parallel to the exhaust flow than injection axis 216, similar to fluid spray atomizer 220. In this way, the spray may be prepared for downstream exhaust aftertreatment. As one example, fluid spray atomizer 520 can be optimized to improve spray dispersion over the cross-section of the mixing region before entering a downstream device, such as SCR catalyst 140. Additionally, fluid-spray atomizer 520 may increase breakup/dispersion of the droplets of the liquid spray as it impacts the louvers or horizontal slats. Fluid-spray atomizer 520 as illustrated in FIG. 5 may include a longitudinal width or thickness indicated at 538 and may at least partially occupy the cross-sectional area or flow area of the first portion 132 of mixing region 130.

In some embodiments, each horizontal slat of fluid spray atomizer 520 may have a different longitudinal width or thickness, as shown in FIG. 5. Thus, fluid spray atomizer 520 may include a plurality of horizontal slats that are staggered on an upstream side but not staggered on a downstream side of the fluid spray atomizer, for example. Therefore, the horizontal slats may align vertically flush with one another on the downstream side, for example.

In some embodiments, each horizontal slat of fluid spray atomizer 520 may have a similar longitudinal width or thickness. Thus, fluid spray atomizer 520 may include a plurality of horizontal slats that are staggered on both the upstream side and the downstream side of the fluid spray atomizer, for example.

It will be appreciated that the longitudinal width of each of the plurality of horizontal slats may be any suitable width. Further, it will be appreciated that the plurality of horizontal slats are not necessarily drawn to scale in FIG. 5. Rather, fluid spray atomizer 520 is illustrated for ease of understanding, to show the louver structure in the step-wise configuration.

It will be appreciated that the embodiment as illustrated in FIG. 5 is provided by way of example, and thus, is not meant to be limiting. Therefore, the aftertreatment system may include additional and/or alternative components than those included within mixing region 130, as shown. As one example, mixing region 130 may include an upstream mixing device and/or a downstream mixing device to improve mixing of the downstream injected liquid, as described above.

Figure 6:
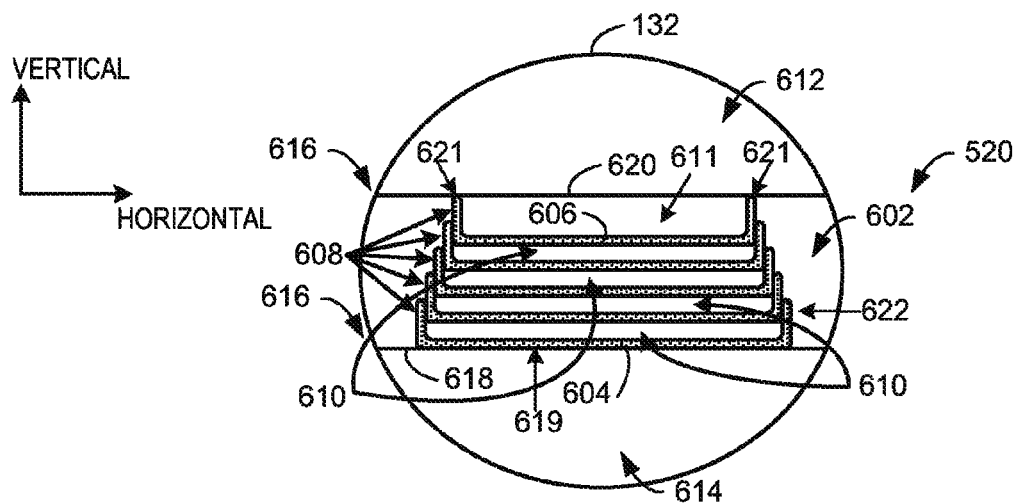
FIG. 6 shows a perspective view of a fluid-spray atomizer that may be included in the example aftertreatment system of FIG. 5 according to an embodiment of the present disclosure.
Figure 7:
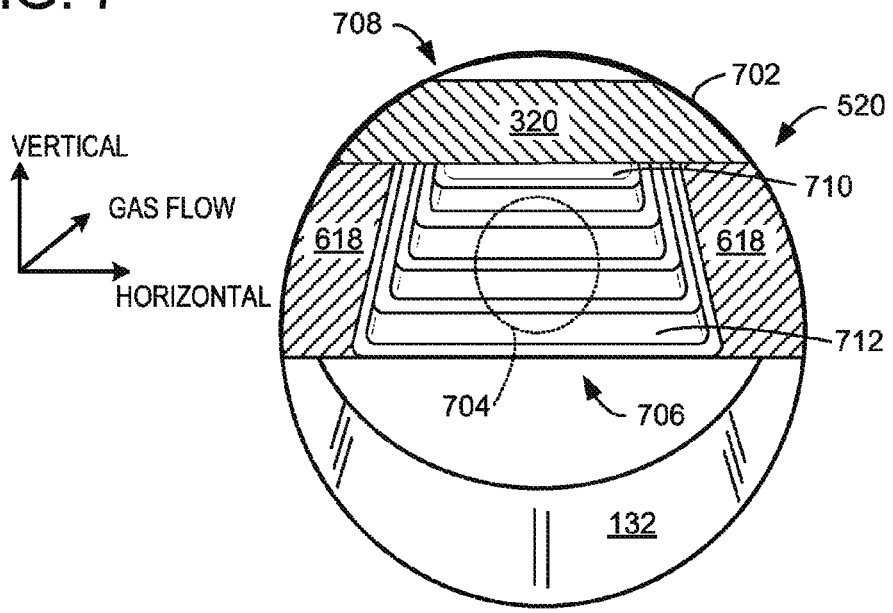
FIG. 7 shows another perspective view of the fluid-spray atomizer of FIG. 6.

FIG. 6 shows a sectional view of fluid-spray atomizer 520 taken along line 6-6 of FIG. 5 and FIG. 7 shows a perspective view of fluid-spray atomizer 520 taken along line 7-7 of FIG. 5.

Referring first to FIG. 6, it shows a cross-sectional view of mixing region 130 looking down axis 200 of FIG. 5. As such, fluid-spray atomizer 520 is positioned within an interior space of mixing region 130, and thus, may be circumferentially surrounded by walls 132.

As shown, fluid-spray atomizer 520 may include a plurality of horizontal slats 602 in a step-wise louver configuration. Further, the plurality of horizontal slats 602 may be stacked on top of each other. FIG. 7 shows another perspective view of fluid spray atomizer 520 in the step-wise louver configuration.

Referring back to FIG. 6, each of the plurality of horizontal slats 602 may be nested inside each other, such that a smaller horizontal slat is nested at least partially inside another, larger horizontal slat, similar to the plurality of horizontal slats 302. Thus, each of the plurality of horizontal slats 602 may be different in size in at least one dimension. For example, each of the plurality of horizontal slats 602 may differ in longitudinal length, wherein the length is measured along the gas flow direction (e.g., axis 200). Said in another way, a position of one horizontal slat may be skewed or staggered with respect to a position of another horizontal slat, for example. As such, the plurality of horizontal slats 602 may be configured to receive a fluid-spray from a non-gas flow direction. For example, injection axis 216 as shown in FIG. 5 follows a non-gas flow direction, as described above.

The embodiment illustrated in FIG. 6 shows the fluid-spray atomizer with five horizontal slats 602 stacked on top of each other and nested at least partially inside each other; however, it will be appreciated that fluid-spray atomizer 520 may include any suitable number of horizontal slats. For example, fluid-spray atomizer 520 may include more than five horizontal slats. As another example, fluid-spray atomizer 520 may include fewer than five horizontal slats.

The plurality of horizontal slats 602 may be stacked such that the longitudinal length of each horizontal slat decreases as the slats are stacked in the vertical direction, wherein the shortest horizontal slat (e.g., shortest longitudinal length) is the closest horizontal slat to injector 136. For example, the stacked horizontal slats may form a pyramid-like structure, wherein the 'top' of the pyramid is closer to injector 136 than the longest horizontal slat, which may be positioned at the 'bottom' of the pyramid. As shown, horizontal slat 604 may be wider in a horizontal direction and may be furthest from fuel injector 136 in a vertical direction. Further, each successive horizontal slat may decrease in width in the horizontal direction within the stack, with horizontal slat 606 on the 'top' with the smallest width in the horizontal direction.

As shown, each horizontal slat may include one or more vertical portions 608 that extend in a substantially orthogonal direction from the horizontal slat. For example, each horizontal slat may include two vertical portions 608 that extend vertically on opposing ends of the horizontal slat. For example, the vertical portions 608 may extend in a vertical direction to wrap around a portion of another horizontal slat. As another example, vertical portions 608 may provide a surface for coupling one horizontal slat to another horizontal slat. For example, each horizontal slat may be welded to another horizontal slat by welding the vertical portions of each of the horizontal slats together, similar to the above description for fluid spray atomizer 220.

Fluid-spray atomizer 520 may further include a plurality of channels 610, similar to channels 310 of fluid spray atomizer 520. As shown, each channel 610 may be formed by a volumetric space between two adjacent horizontal slats. Therefore, the embodiment as illustrated in FIG. 6 includes four channels 610. However, it will be appreciated that fluid-spray atomizer 520 may include any suitable number of channels without departing from the scope of this disclosure. Thus, fluid-spray atomizer 520 is not limited to the four channels depicted in FIG. 6.

Channels 610 may enable exhaust gas flow to pass through fluid-spray atomizer 520 in the gas flow direction. Further, channels 610 may entrain droplets from an injected fluid-spray. Therefore, channels 610 may enable exhaust gas flow and droplet flow through a length of the fluid-spray atomizer in the gas flow direction. In this way, channels 610, and likewise horizontal slats 602, have a streamline position within the exhaust gas flow.

Fluid-spray atomizer 520 may further include a top fluid flow region 612 and a bottom fluid flow region 614. Regions 612 and 614 may be configured to enable exhaust gas flow and/or droplet flow similar to channels 610, as well as channels 310 and regions 312 and 314 as described with respect to FIG. 3 above.

Fluid-spray atomizer 520 may further include one or more attachment mechanisms 616 for attaching fluid-spray atomizer 520 to walls 132. For example, the one or more attachment mechanisms may be one or more plates coupled to a horizontal slat for welding the fluid-spray atomizer to the inner walls of the mixing region. As shown, fluid-spray atomizer 520 may include a first welding plate 618 coupled to horizontal slat 604 for welding the atomizer to the mixing region walls, for example. In some embodiments, first welding plate 618 may be welded to a bottom surface 619 of horizontal slat 604 and welded to mixing region walls 132. However, it will be appreciated that first welding plate 618 may be welded, or otherwise attached, to mixing region walls 132 in other ways.

Additionally or alternatively, fluid-spray atomizer 520 may include a second welding plate 620 coupled to horizontal slat 606 for welding the atomizer to the mixing region walls. As shown, second welding plate 620 may be coupled to a top surface 621 of vertical portions 608 of horizontal slat 606 and welded to mixing region walls 132. In such a scenario, an additional channel 611 may be formed between horizontal slat 606 and second welding plate 620. It will be appreciated that channel 611 may be similar to channels 610 as already described. However, it will also be appreciated that channel 611 may differ to some degree. Further, it will be appreciated that second welding plate 620 may be welded, or otherwise attached, to mixing region walls 132 in other ways.

Further, first and second welding plates 618 and 620 may be coupled to other portions of fluid-spray atomizer 520, than the embodiment illustrated in FIG. 6. For example, one or more of the first and second welding plates may be coupled to a side surface 622 of a horizontal slat and/or of a vertical portion of the horizontal slat. It will be appreciated that the attachment mechanism may be coupled to any suitable portion of fluid-spray atomizer 520 and to any suitable portion of mixing region walls 132 without departing from the scope of this disclosure.

The resulting geometric configuration of the fluid-spray atomizer may increase fluid-spray dispersion such that the droplet size of the fluid-spray is reduced upon contact with the plurality of horizontal slats, for example. Further, due to the above described geometric configuration, the fluid-spray atomizer may improve droplet mixing with the exhaust gas flow such that the mixing region may be reduced in length along the gas flow direction. The fluid-spray atomizer may be positioned within the mixing region so as to receive a spray footprint from injector 136.

For example, FIG. 7 shows another view of fluid-spray atomizer 520 from a perspective view from injector 136. In particular, the perspective view may be a planar cut along line 7-7 of FIG. 5. Therefore, fluid-spray atomizer 520 may be viewed looking down injector boss 210 towards the exhaust gas flow through mixing region 130. As shown, a portion of a field of view of the perspective view shown in FIG. 7 may be outlined by injector boss inner walls 702, whereas other portions of the field of view may be outlined by mixing region walls 132, for example.

As shown, a spray footprint 704 may strike a central region of fluid-spray atomizer 520, similar to the above description for FIG. 4. In this way, an injected fluid may be aimed in the central region coinciding with spray footprint 704 to maximize fluid-spray droplet mixing with the exhaust gas flow. As described above, the injected fluid may strike the fluid-spray atomizer from a non-gas flow direction, such as along injection axis 216, for example.

As shown, fluid-spray atomizer 520 may be in a stacked step-wise louver configuration such that each channel 610 is exposed to the fluid-spray. FIG. 5 shows a side view of the step-wise louver configuration of fluid-spray atomizer 520. Due to the stacked step-wise louver configuration, a position of one horizontal slat may be skewed or stagger with respect to a position of another horizontal slat.

Referring to both FIGS. 5 and 7, the plurality of horizontal slats 602 may be stacked such that the horizontal slats form steps on an upstream side 706 of fluid-spray atomizer 520. Said in another way, the plurality of horizontal slats 602 may be arranged in tiers that cascade by increasing longitudinal width from a top step 710 (e.g., horizontal slat 606) to a bottom step 712 (e.g., horizontal slat 604), wherein each tier is stacked on top of each other in the vertical direction. Thus, horizontal slat 604 may have a longer longitudinal length than horizontal slat 606, with intermediate horizontal slats having a longitudinal length that is between a value for horizontal slat 604 and a value for horizontal slat 606.

Further, as shown best in FIG. 5, the plurality of horizontal slats 602 may be stacked on a downstream side 708 such that each horizontal slat is aligned in a vertical direction. Said in another way, a downstream side of each of the plurality of horizontal slats may be flush with one another.

In this way, the fluid-spray may strike the central region of the fluid-spray atomizer resulting in spray footprint 704 striking at the upstream side 706. The fluid-spray may hit the fluid-spray atomizer such that the fluid-spray is broken up into substantially smaller droplets. For example, injector 136 may inject a fluid-spray including coarse urea droplets approximately 80 to 100 microns in diameter. Upon striking the fluid-spray atomizer, the coarse urea droplets may be reduced in size to droplets approximately 20 to 50 microns in diameter, for example. Thus, the coarse droplets may be reduced in size such that the droplets are finer due to the geometric structure of the fluid-spray atomizer. It will be appreciated that the above is provided as one non-limiting example of reducing a droplet size and that other droplet size reductions are possible without departing from the scope of this disclosure.

Further, it will be appreciated that the geometric structure of the fluid-spray atomizer may be configured to receive any suitable fluid-spray footprint in terms of size and geometry. For example, the fluid-spray atomizer may reduce reductant spray droplet size from a filled cone spray, a hollow cone spray, a multiple stream spray, etc.

The plurality of channels 610 may entrain the finer droplets such that the exhaust gas flow carries the finer droplets through channels 610. The finer droplets may travel through the length of the fluid-spray atomizer in the gas flow direction. The particular geometry of the fluid-spray atomizer may enable the finer droplets to exit the fluid-spray atomizer at the downstream side 708 such that the finer droplets are well dispersed within the mixing region 130. Said in another way, the finer droplets may be released from the fluid-spray atomizer such that mixing is enhanced due to a sufficiently wide spray dispersion within mixing region 130. Thus, a uniform mixture of exhaust gas and finer reductant droplet size may be presented to the downstream SCR catalyst. Therefore, $NO_x$ may be sufficiently reduced from the exhaust gas.

Further, it will be appreciated that the fluid-spray atomizer of the present disclosure may be included in any exhaust system. Since the fluid-spray atomizer is attached to the walls of the mixing region via one or more attachment mechanisms, such as one or more welding plates, the fluid-spray atomizer may be suitable for any sized exhaust passage. For example, the fluid-spray atomizer may be configured for any pipe diameter provided that the fluid-spray atomizer is positioned such that a fluid-spray footprint strikes the fluid-spray atomizer as described above. In this way, the fluid-spray atomizer of the present disclosure is adaptable for any exhaust system.

Further, since the fluid-spray atomizer of the present disclosure includes the plurality of horizontal slats that are in line with the exhaust gas flow without twisting the horizontal slats, structural stresses are reduced. For example, current designs may use sheet metal that is cut into segments and then twisted to align the segments with the exhaust gas flow. The present disclosure provides horizontal slats in line with the exhaust gas flow without twisting. Instead, the fluid-spray atomizer arranges the horizontal slats by stacking the slats in a nested, step-wise configuration, as described above.

Further, since the fluid-spray atomizer positions the horizontal slats in line with the exhaust gas flow, the fluid-spray atomizer may be located at any suitable position with the exhaust system. Thus, the fluid-spray atomizer of the present disclosure is not limited to be positioned substantially near a pipe bend. However, in some embodiments, the fluid-spray atomizer may be positioned substantially near a pipe bend, if desired.

Further, it will be appreciated that the fluid-spray atomizer described herein is not limited to exhaust aftertreatment systems. The fluid-spray atomizer may be used to atomize a fluid-spray in other areas. For example, the fluid-spray atomizer may atomize a fluid-spray within any engine air passage, and an exhaust passage is provided as one non-limiting example. Thus, the fluid-spray atomizer may disperse fluid-spray droplets in association with any engine system without departing from the scope of this disclosure.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust aftertreatment system comprising:
   a catalyst;
   an injector positioned upstream from the catalyst; and
   a fluid-spray atomizer positioned between the catalyst and the injector, the fluid-spray atomizer including a plurality of horizontal slats, each horizontal slat being a different size horizontally such that successively smaller horizontal slats are each vertically nested at least partially inside vertical side walls of a larger horizontal slat.

2. The system of claim 1, wherein the catalyst is a selective catalytic reductant catalyst and wherein a smallest horizontal slat is closest to the injector.

3. The system of claim 1, wherein the injector injects a reductant upstream from the catalyst, the reductant injected in a non-gas flow direction and wherein each of the plurality of horizontal slats includes a vertical portion that wraps around a portion of an adjacent horizontal slat.

4. The system of claim 3, wherein the reductant is aimed at the fluid-spray atomizer.

5. The system of claim 4, wherein a spray footprint of the reductant strikes the fluid-spray atomizer at an upstream side of the fluid-spray atomizer.

6. The system of claim 5, wherein the upstream side of the fluid-spray atomizer is in a step-wise configuration.

7. The system of claim 1, wherein the plurality of horizontal slats are nested and stacked such that the smaller horizontal slat is nested at least partially inside the larger horizontal slat and stacked on top of the larger horizontal slat in a vertical direction, wherein the plurality of horizontal slats include overlapping vertical portions for welding each of the plurality of nested horizontal slats to each other.

8. The system of claim 7, wherein the fluid-spray atomizer further includes a plurality of channels formed between the plurality of horizontal slats that are nested and stacked.

9. The system of claim 8, wherein the plurality of channels entrain fluid-spray droplets to a downstream side of the fluid-spray atomizer.

10. The system of claim 9, wherein the entrained fluid-spray droplets are released from the downstream side to a mixing region of an exhaust passage upstream from the catalyst and downstream from the fluid-spray atomizer.

11. The system of claim 1, wherein the fluid-spray atomizer reduces a droplet size of a fluid-spray injected by the injector.

12. A system for an engine comprising:
an injector; and
a fluid-spray atomizer positioned within an engine air passage downstream from the injector, the fluid-spray atomizer including a plurality of channels in line with an engine flow of the engine air passage, the plurality of channels forming a cascading tier to receive a fluid-spray from the injector in a non-gas flow direction, and the plurality of channels formed between a plurality of horizontal slats, each horizontal slat being different in size horizontally such that successively smaller horizontal slats are each vertically nested at least partially inside vertical portions of a larger horizontal slat.

13. The system of claim 12, wherein each of the plurality of horizontal slats include vertical portions to weld each of the nested plurality of horizontal slats to each other and wherein the vertical portions of adjacent horizontal slats are at least partially overlapping.

14. The system of claim 13, wherein a position of an upstream side of one of the plurality of horizontal slats is skewed from a position of an upstream side of another one of the plurality of horizontal slats.

15. The system of claim 14, wherein the injector injects the fluid-spray in the non-gas flow direction towards a central region of the fluid-spray atomizer such that a droplet size of the fluid-spray is reduced upon contact with the plurality of horizontal slats, and the droplets are entrained through a length of each of the plurality of channels to a downstream side of the fluid-spray atomizer to be released to a mixing region of the engine air passage.

16. A fluid-spray atomizer including:
a plurality of partially nested slats with successively smaller horizontal lengths such that each of the plurality of partially nested slats is vertically nested inside at least a portion of a vertical portion of a larger adjacent slat;
a plurality of channels formed between each of the plurality of partially nested slats; and
an attachment mechanism to attach the fluid-spray atomizer to an interior wall of an engine air passage.

17. The fluid-spray atomizer of claim 16, wherein the plurality of partially nested slats are in line with an exhaust gas flow flowing through the engine air passage.

18. The fluid-spray atomizer of claim 16, wherein the plurality of partially nested slats include a horizontal portion and a vertical portion, the vertical portion providing an interface for welding each of the plurality of nested slats to each other.

19. The fluid-spray atomizer of claim 18, wherein each of the plurality of partially nested slats includes two vertical portions extending from the horizontal portion in a vertical direction, the two vertical portions perpendicular to the horizontal portion.

20. The fluid-spray atomizer of claim 19, wherein each of the plurality of partially nested slats are partially nested such that each partially nested slat is coupled to the vertical portions of another nested slat, and wherein a plurality of channels are formed between the plurality of partially nested slats, the plurality of channels configured to entrain fluid-spray droplets injected into the engine air passage by an injector aimed at the fluid-spray atomizer.

* * * * *